(12) United States Patent
Chand et al.

(10) Patent No.: US 8,484,250 B2
(45) Date of Patent: Jul. 9, 2013

(54) DATA FEDERATION WITH INDUSTRIAL CONTROL SYSTEMS

(75) Inventors: Sujeet Chand, Brookfield, WI (US); Stephen C. Briant, Moon Township, PA (US); Kenwood H. Hall, Hudson, OH (US); Gavan W. Hood, Upper Lockyer (AU); John J. Baier, Mentor, OH (US); Michael D. Kalan, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1168 days.

(21) Appl. No.: 11/239,937

(22) Filed: Sep. 30, 2005

(65) Prior Publication Data

US 2007/0078862 A1    Apr. 5, 2007

(51) Int. Cl.
*G06F 17/30* (2006.01)
*G06F 7/00* (2006.01)

(52) U.S. Cl.
CPC ................................ *G06F 17/30589* (2013.01)
USPC ........... 707/794; 707/790; 707/792; 707/793; 707/802

(58) Field of Classification Search
CPC ................................................ G06F 17/30589
See application file for complete search history.

(56) References Cited

U.S. PATENT DOCUMENTS

| | | | |
|---|---|---|---|
| 4,268,901 A | 5/1981 | Subrizi et al. |
| 4,347,564 A | 8/1982 | Sugano et al. |
| 4,623,964 A | 11/1986 | Getz et al. |
| 4,990,838 A | 2/1991 | Kawato et al. |
| 5,072,374 A | 12/1991 | Sexton et al. |
| 5,185,708 A | 2/1993 | Hall et al. |
| 5,253,184 A | 10/1993 | Kleinschnitz |
| 5,301,320 A | 4/1994 | McAtee et al. |
| 5,367,624 A | 11/1994 | Cooper |
| 5,446,868 A | 8/1995 | Gardea et al. |
| 5,455,775 A | 10/1995 | Huber et al. |
| 5,485,620 A | 1/1996 | Sadre et al. |
| 5,504,891 A | 4/1996 | Motoyama et al. |
| 5,537,585 A | 7/1996 | Blickenstaff et al. |
| 5,572,731 A | 11/1996 | Morel et al. |

(Continued)

FOREIGN PATENT DOCUMENTS

EP    1553471 A1    7/2005

OTHER PUBLICATIONS

Pitzek et al., Configuration and Management of a Real-Time Smart Transducer Network, 2003 IEEE, 2003, 4 pages.

(Continued)

*Primary Examiner* — Fred I Ehichioya
*Assistant Examiner* — Garrett Smith
(74) *Attorney, Agent, or Firm* — Turocy & Watson, LLP; Alexander R. Kuszewski; John M. Miller

(57) ABSTRACT

An organizational model of a hierarchical system can be distributed across various elements of an enterprise. Such elements include representations of the system that are maintained on higher-level business servers and other representations that serve control elements of the system such as programmable logic controllers and/or other industrial control components. In one aspect, an industrial automation system is provided. The system includes at least one controller to instantiate a portion of an organizational hierarchy. A communications component in the controller interacts with at least one other portion of the organizational hierarchy to facilitate data exchange and control between various components of an enterprise.

26 Claims, 13 Drawing Sheets

U.S. PATENT DOCUMENTS

| | | | |
|---|---|---|---|
| 5,611,059 A | 3/1997 | Benton et al. | |
| 5,619,724 A | 4/1997 | Moore | |
| 5,634,048 A | 5/1997 | Ryu et al. | |
| 5,644,740 A | 7/1997 | Kiuchi | |
| 5,675,748 A | 10/1997 | Ross | |
| 5,715,413 A | 2/1998 | Ishai et al. | |
| 5,721,905 A | 2/1998 | Elixmann et al. | |
| 5,761,499 A | 6/1998 | Sonderegger | |
| 5,784,620 A * | 7/1998 | Isham | 719/316 |
| 5,797,137 A | 8/1998 | Golshani et al. | |
| 5,812,773 A | 9/1998 | Norin | |
| 5,828,851 A | 10/1998 | Nixon et al. | |
| 5,832,486 A | 11/1998 | Itoh et al. | |
| 5,838,563 A | 11/1998 | Dove et al. | |
| 5,848,273 A | 12/1998 | Fontana et al. | |
| 5,862,052 A | 1/1999 | Nixon et al. | |
| 5,884,025 A | 3/1999 | Baehr et al. | |
| 5,884,033 A | 3/1999 | Duvall et al. | |
| 5,913,029 A | 6/1999 | Shostak | |
| 5,924,094 A | 7/1999 | Sutter | |
| 5,936,539 A | 8/1999 | Fuchs | |
| 5,940,294 A | 8/1999 | Dove | |
| 5,940,854 A | 8/1999 | Green, Jr. et al. | |
| 5,951,440 A | 9/1999 | Reichlinger | |
| 5,960,420 A | 9/1999 | Leymann et al. | |
| 5,966,705 A | 10/1999 | Koneru | |
| 5,978,577 A | 11/1999 | Rierden et al. | |
| 5,980,078 A | 11/1999 | Krivoshein et al. | |
| 5,983,016 A | 11/1999 | Brodsky et al. | |
| 6,011,899 A | 1/2000 | Ohishi et al. | |
| 6,032,208 A | 2/2000 | Nixon et al. | |
| 6,044,217 A | 3/2000 | Brealey et al. | |
| 6,063,129 A | 5/2000 | Dadd et al. | |
| 6,081,899 A | 6/2000 | Byrd | |
| 6,098,116 A | 8/2000 | Nixon et al. | |
| 6,101,531 A | 8/2000 | Eggleston et al. | |
| 6,110,214 A * | 8/2000 | Klimasauskas | 703/2 |
| 6,157,864 A * | 12/2000 | Schwenke et al. | 700/79 |
| 6,161,051 A * | 12/2000 | Hafemann et al. | 700/86 |
| 6,195,591 B1 | 2/2001 | Nixon et al. | |
| 6,208,987 B1 | 3/2001 | Nihei | |
| 6,234,899 B1 | 5/2001 | Nulph | |
| 6,246,972 B1 * | 6/2001 | Klimasauskas | 703/2 |
| 6,266,726 B1 | 7/2001 | Nixon et al. | |
| 6,268,853 B1 * | 7/2001 | Hoskins et al. | 700/83 |
| 6,275,977 B1 | 8/2001 | Nagai et al. | |
| 6,308,168 B1 | 10/2001 | Dovich et al. | |
| 6,308,224 B1 | 10/2001 | Leymann et al. | |
| 6,311,187 B1 | 10/2001 | Jeyaraman | |
| 6,327,511 B1 | 12/2001 | Naismith et al. | |
| 6,336,152 B1 | 1/2002 | Richman et al. | |
| 6,356,920 B1 | 3/2002 | Vandersluis | |
| 6,377,957 B1 | 4/2002 | Jeyaraman | |
| 6,393,566 B1 | 5/2002 | Levine | |
| 6,398,106 B1 | 6/2002 | Ulvr et al. | |
| 6,409,082 B1 | 6/2002 | Davis et al. | |
| 6,411,987 B1 | 6/2002 | Steger et al. | |
| 6,415,983 B1 | 7/2002 | Ulvr et al. | |
| 6,425,051 B1 | 7/2002 | Burton et al. | |
| 6,438,744 B2 | 8/2002 | Toutonghi et al. | |
| 6,445,963 B1 | 9/2002 | Blevins et al. | |
| 6,446,202 B1 | 9/2002 | Krivoshein et al. | |
| 6,457,053 B1 | 9/2002 | Satagopan et al. | |
| 6,469,986 B1 | 10/2002 | Lecheler et al. | |
| 6,473,656 B1 | 10/2002 | Langels et al. | |
| 6,484,061 B2 | 11/2002 | Papadopoulos et al. | |
| 6,501,996 B1 | 12/2002 | Bieber | |
| 6,505,247 B1 | 1/2003 | Steger et al. | |
| 6,510,352 B1 | 1/2003 | Badavas et al. | |
| 6,539,271 B2 | 3/2003 | Lech et al. | |
| 6,539,430 B1 | 3/2003 | Humes | |
| 6,539,458 B2 | 3/2003 | Holmberg | |
| 6,556,950 B1 * | 4/2003 | Schwenke et al. | 702/183 |
| 6,618,856 B2 * | 9/2003 | Coburn et al. | 717/135 |
| 6,631,519 B1 | 10/2003 | Nicholson et al. | |
| 6,643,555 B1 | 11/2003 | Eller et al. | |
| 6,661,426 B1 | 12/2003 | Jetha et al. | |
| 6,664,981 B2 | 12/2003 | Ashe et al. | |
| 6,681,227 B1 | 1/2004 | Kojima et al. | |
| 6,687,817 B1 | 2/2004 | Paul | |
| 6,697,797 B1 | 2/2004 | Hoggatt et al. | |
| 6,704,746 B2 | 3/2004 | Sokolov et al. | |
| 6,714,949 B1 | 3/2004 | Frey, Jr. | |
| 6,714,981 B1 | 3/2004 | Skaggs | |
| 6,738,821 B1 | 5/2004 | Wilson et al. | |
| 6,745,089 B2 | 6/2004 | Rasmussen et al. | |
| 6,748,486 B2 | 6/2004 | Burton et al. | |
| 6,751,634 B1 | 6/2004 | Judd | |
| 6,758,403 B1 | 7/2004 | Keys et al. | |
| 6,760,721 B1 | 7/2004 | Chasen et al. | |
| 6,760,732 B2 | 7/2004 | Busshart et al. | |
| 6,763,395 B1 | 7/2004 | Austin | |
| 6,766,312 B2 | 7/2004 | Landt | |
| 6,769,095 B1 | 7/2004 | Brassard et al. | |
| 6,778,537 B1 | 8/2004 | Ishibashi | |
| 6,801,822 B1 | 10/2004 | Fujiwara et al. | |
| 6,807,632 B1 | 10/2004 | Carpentier et al. | |
| 6,809,732 B2 | 10/2004 | Zatz et al. | |
| 6,836,892 B2 | 12/2004 | Ikoma et al. | |
| 6,839,790 B2 | 1/2005 | Barros De Almeida et al. | |
| 6,842,769 B1 | 1/2005 | Kim et al. | |
| 6,853,920 B2 | 2/2005 | Hsiung et al. | |
| 6,865,509 B1 | 3/2005 | Hsiung et al. | |
| 6,868,413 B1 | 3/2005 | Grindrod et al. | |
| 6,874,145 B1 | 3/2005 | Ye et al. | |
| 6,874,146 B1 | 3/2005 | Iyengar | |
| 6,880,060 B2 | 4/2005 | Talagala et al. | |
| 6,889,282 B2 | 5/2005 | Schollenberger | |
| 6,901,578 B1 | 5/2005 | Beaven et al. | |
| 6,904,473 B1 | 6/2005 | Bloxham et al. | |
| 6,920,474 B2 | 7/2005 | Walsh et al. | |
| 6,928,521 B1 | 8/2005 | Burton et al. | |
| 6,930,985 B1 | 8/2005 | Rathi et al. | |
| 6,934,749 B1 | 8/2005 | Black et al. | |
| 6,938,079 B1 | 8/2005 | Anderson et al. | |
| 6,944,626 B2 | 9/2005 | Cameron et al. | |
| 6,947,947 B2 | 9/2005 | Block et al. | |
| 6,950,900 B1 | 9/2005 | McKean et al. | |
| 6,952,705 B2 * | 10/2005 | Knoblock et al. | 707/103 R |
| 6,954,770 B1 | 10/2005 | Carlson et al. | |
| 6,961,728 B2 | 11/2005 | Wynblatt et al. | |
| 6,973,556 B2 | 12/2005 | Milligan et al. | |
| 6,975,913 B2 | 12/2005 | Kreidler et al. | |
| 2002/0012401 A1 | 1/2002 | Karolys et al. | |
| 2002/0013748 A1 | 1/2002 | Edmison et al. | |
| 2002/0069167 A1 | 6/2002 | Conlow | |
| 2002/0073236 A1 | 6/2002 | Helgeson et al. | |
| 2002/0087786 A1 | 7/2002 | Burton et al. | |
| 2002/0091838 A1 | 7/2002 | Rupp et al. | |
| 2002/0103785 A1 | 8/2002 | Harvey | |
| 2002/0194577 A1 | 12/2002 | Connor et al. | |
| 2003/0014387 A1 | 1/2003 | Kreidler et al. | |
| 2003/0014500 A1 * | 1/2003 | Schleiss et al. | 707/501.1 |
| 2003/0065673 A1 | 4/2003 | Grobler et al. | |
| 2003/0090514 A1 | 5/2003 | Cole et al. | |
| 2003/0120710 A1 | 6/2003 | Pulsipher et al. | |
| 2003/0123467 A1 | 7/2003 | Du et al. | |
| 2003/0126308 A1 | 7/2003 | Kim | |
| 2003/0177114 A1 | 9/2003 | Lin et al. | |
| 2003/0212828 A1 | 11/2003 | Miyazaki et al. | |
| 2003/0218641 A1 | 11/2003 | Longobardi | |
| 2004/0004629 A1 * | 1/2004 | Hamilton et al. | 345/700 |
| 2004/0006401 A1 | 1/2004 | Yamada et al. | |
| 2004/0024995 A1 | 2/2004 | Swaine | |
| 2004/0044421 A1 | 3/2004 | Brune et al. | |
| 2004/0073565 A1 | 4/2004 | Kaufman et al. | |
| 2004/0098153 A1 | 5/2004 | Neudeck | |
| 2004/0139079 A1 | 7/2004 | Eryurek et al. | |
| 2004/0167790 A1 | 8/2004 | Grasse | |
| 2004/0196855 A1 | 10/2004 | Davies et al. | |
| 2004/0199655 A1 | 10/2004 | Davies et al. | |
| 2004/0203620 A1 | 10/2004 | Thome et al. | |
| 2004/0210629 A1 | 10/2004 | Klindt et al. | |
| 2004/0249771 A1 | 12/2004 | Berg et al. | |
| 2004/0260591 A1 | 12/2004 | King | |
| 2005/0005289 A1 | 1/2005 | Adolph et al. | |
| 2005/0044112 A1 | 2/2005 | Yamamoto et al. | |

| | | |
|---|---|---|
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0071347 A1* | 3/2005 | Chau et al. .................. 707/100 |
| 2005/0091227 A1* | 4/2005 | McCollum et al. ........... 707/100 |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |

OTHER PUBLICATIONS

European Search Report dated Jun. 12, 2005 for European Patent Application Serial No. EP05016793, 3 pages.
John Kubiatowicz, et al. "OceanStore: An Architecture for Global-Scale Persistent Storage" ASPLOS 2000, Cambridge, Massachusetts (2000).
Roy Goldman, et al. "From Semistructured Data to XML: Migrating the Lore Data Model and Query Language" (1999).
Chinese OA dated Jun. 6, 2008 for CN Application Serial No. 200610131757.X, 15 pages.
European Search Report for European Patent Application No. EP06020456 dated Aug. 26, 2011, 5 pages.

* cited by examiner

DATA FEDERATION WITH INDUSTRIAL CONTROL SYSTEMS

TECHNICAL FIELD

The subject invention relates generally to industrial control systems and more particularly to distributing and manipulating data across data hierarchies that can be shared between organizational models and industrial control systems.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modem drivers such as efficiency and productivity improvement, and cost-reduction, are requiring manufacturers to collect, analyze, and optimize data and metrics from global manufacturing sites. For example, a food company may have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An organizational model and addressing mode is provided that enables data to be automatically and efficiently exchanged from various layers of an organization, across organizational boundaries, and/or exchanged between lower-level control entities to upper-tiers of the organization. In one aspect, a hierarchical model of an organization is distributed across control systems and other components of the organization such as business computers. Such hierarchy can be stored in an instantiation of a controller which is also accessible by the controller. This enables external applications to address data in the controller via a controller namespace and/or via an organization hierarchy such as provided by a hierarchical plant model, for example. Portions of the hierarchy can be implemented in the controller without being connected to the central system. This enables distributed development by multiple users such as outside equipment manufacturers (OEMs).

The organizational hierarchy can also include other organizational units, controller scoped tags, programs with associated program scoped tags, add-on instructions, routines, operator interface screens, and/or user defined information such has procedures and help files, for example. A local hierarchy stored in a controller can be connected to the system hierarchy via a "mount point." The "mount point" can be connected with a particular location in the system hierarchy during a configuration operation which associates the respective controller with a specific organizational project.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

An organizational model of a hierarchical system can be distributed across various elements of an enterprise. Such elements include representations of the system that are maintained on higher-level business servers and other representations that serve control elements of the system such as programmable logic controllers and/or other industrial control components. In one aspect, an industrial automation system is provided. The system includes at least one controller to instantiate a portion of an organizational hierarchy. A communications component in the controller interacts with at least one other portion of the organizational hierarchy to facilitate data exchange and control between various components of an enterprise.

It is noted that as used in this application, terms such as "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
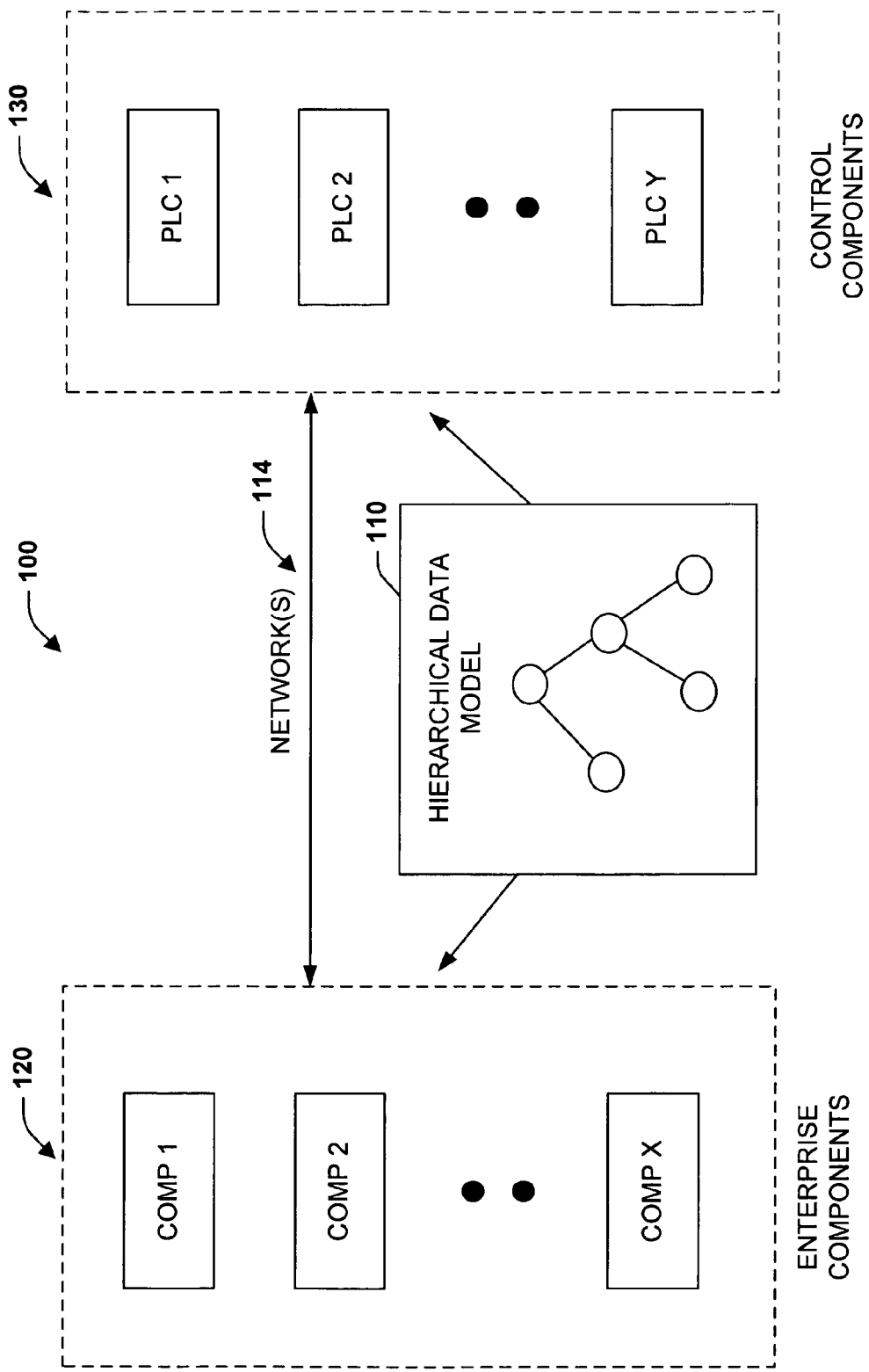
FIG. 1 is a schematic block diagram illustrating data federation in an organizational data model.

Referring initially to FIG. 1, a system 100 illustrates data federation concepts in an organizational data model. A hierarchical data model 110 is illustrated having various nodes and branches that store data at multiple locations throughout the system 100. Such model 110 can be distributed across a network 114 to provide a collective or federated database. As illustrated, an enterprise 120 may have one or more computers or network components that communicate across the network 114 to one or more industrial control components 130 such as programmable logic controllers (PLCs) 130. Thus, the data hierarchy 110 having data nodes and branches can be managed as a singular or collective entity while being viewed, managed and distributed across substantially all or portions of the enterprise 120 and/or PLC 130.

The system 100 enables combining organizational information called an organizational or hierarchical data model 110 which represents a common model of a plant that can be based in the S88 or S95 model, for example, and is distributed among computers of the enterprise 120 and industrial controllers 130, for example. The model 110 can be viewed as an Organizational Model—a tree-like hierarchical and heterogeneous structure of organizational Units. For instance, respective Organizational Units may include other Organizational Units. Organizational Units can be either physical locations (e.g., Site, Area) or logical grouping node or collection (e.g., Enterprise as a collection of Sites). The nodes in the organizational hierarchy or model 110 can have associated items representing the plant's production and control equipment, tags, backing tags (e.g., Alarm & Event and AOI objects), programs, equipment phases, I/O devices, and other application related entities. These organizational units thus can form an application view of the user's system.

A typical system 100 can assign the upper levels of the hierarchy such as an Enterprise node and site to a computer system and the lower levels such as area, line, cell and machine could be contained in multiple industrial controllers each of which can include components which are members of one or more organization units such as area or area model. An organization unit such as area can contain components from one or more controllers. To ease the integration of data with information technology (IT) applications, methods are provided for defining various data structures in the IT space and translating those to the controller and a method using transactions to connect the controller and IT versions of the structure.

Before proceeding, it is noted that the enterprise 120 can include various computer or network components such as servers, clients, communications modules, mobile computers, wireless components, and so forth which are capable of interacting across the network 114. Similarly, the term PLC as used herein can include functionality that can be shared across multiple components, systems, and or networks 114. For example, one or more PLCs 130 can communicate and cooperate with various network devices across the network 114. This can include substantially any type of control, communications module, computer, I/O device, Human Machine Interface (HMI)) that communicate via the network 114 which includes control, automation, and/or public networks. The PLC 130 can also communicate to and control various other devices such as Input/Output modules including Analog, Digital, Programmed/Intelligent I/O modules, other programmable controllers, communications modules, and the like.

The network 114 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In addition to various hardware and/or software components, various interfaces can be provided to manipulate the hierarchical or organizational data model 110 where various examples are illustrated in more detail below. This can include a Graphical User Interface (GUI) to interact with the model 110 or other components of the hierarchy such as any type of application that sends, retrieves, processes, and/or manipulates factory or enterprise data, receives, displays, formats, and/or communicates data, and/or facilitates operation of the enterprise 120 and/or PLCs 130. For example, such interfaces can also be associated with an engine, server, client, editor tool or web browser although other type applications can be utilized.

The GUI can include a display having one or more display objects (not shown) for manipulating the model 110 including such aspects as configurable icons, buttons, sliders, input boxes, selection options, menus, tabs and so forth having multiple configurable dimensions, shapes, colors, text, data and sounds to facilitate operations with the model 110. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Before proceeding, it is noted that FIGS. 3-8 are directed to exemplary hierarchies and data arrangements. It is to be appreciated however than substantially any data hierarchy that is distributed across an enterprise or business and/or shared across an industrial control system is within the scope contemplated herein.

Figure 2:
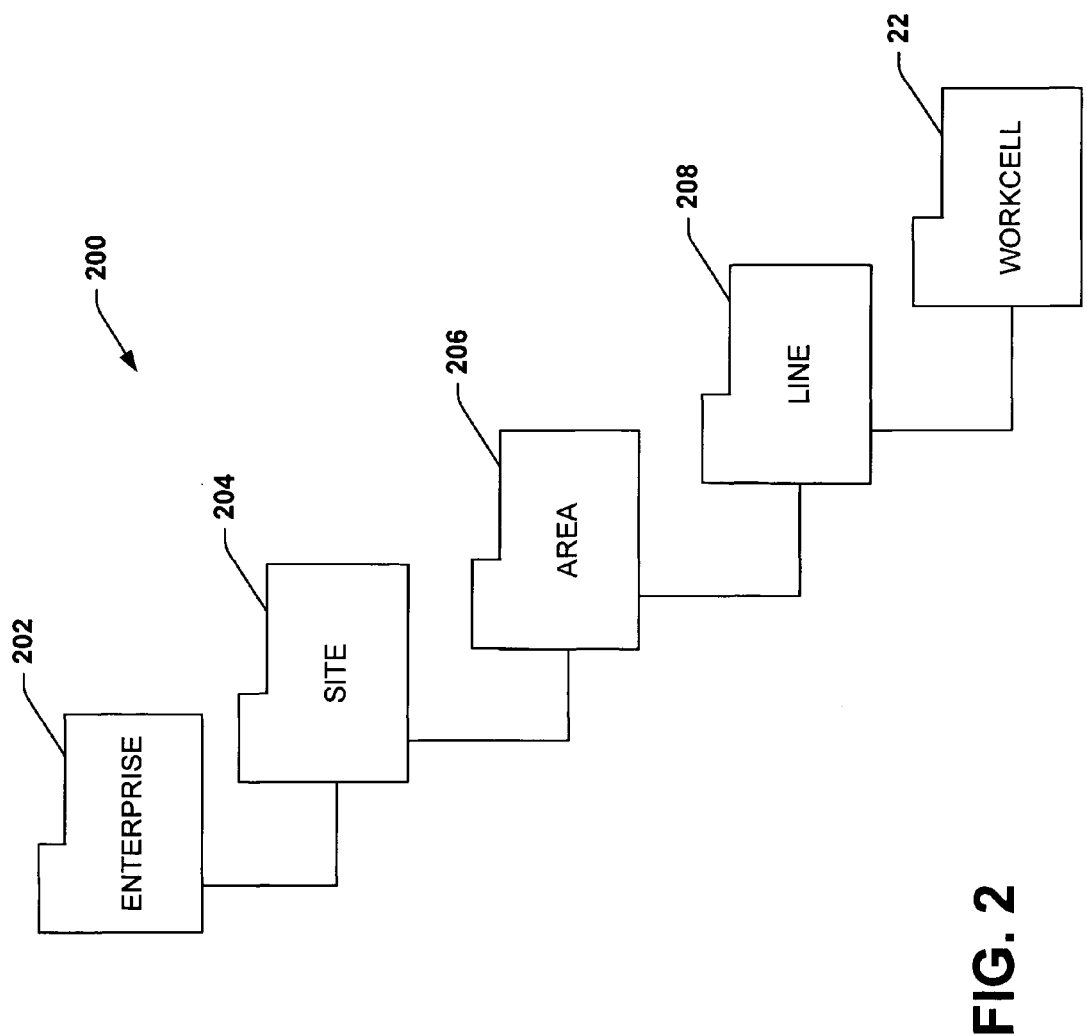
FIG. 2 is a diagram illustrating an example organizational hierarchy.

Referring now to FIG. 2, an exemplary hierarchical structure 200 which can be utilized in connection with the hierarchically structured data model described herein is illustrated. For example, the data model can facilitate nested structures, thereby mitigating deficiencies associated with data models that employ flat namespaces although flat namespaces can be employed as well. The example structure 200 includes an enterprise level 202, where a particular enterprise can be represented within data structured in accordance with a hierarchical data model. Beneath the enterprise level 202 can be a site level 204, so that a particular factory (site) within an enterprise can be represented within a data packet. Beneath the site level 204 an area level 206 can exist, which specifies an area within the factory that relates to the data. A line level 208 can lie beneath the area level 206, wherein the line level 208 is indicative of a line associated with particular data. Beneath the line level 208 a work-cell level 22 can exist, thereby indicating a work-cell associated with the data. Utilizing a nested, hierarchical data model, PLCs can become more aware of data associated therewith. Furthermore, the hierarchy 200 can be customized by an owner of such hierarchy. For instance, more granular objects/levels can be defined within the hierarchy 200.

Figure 3:
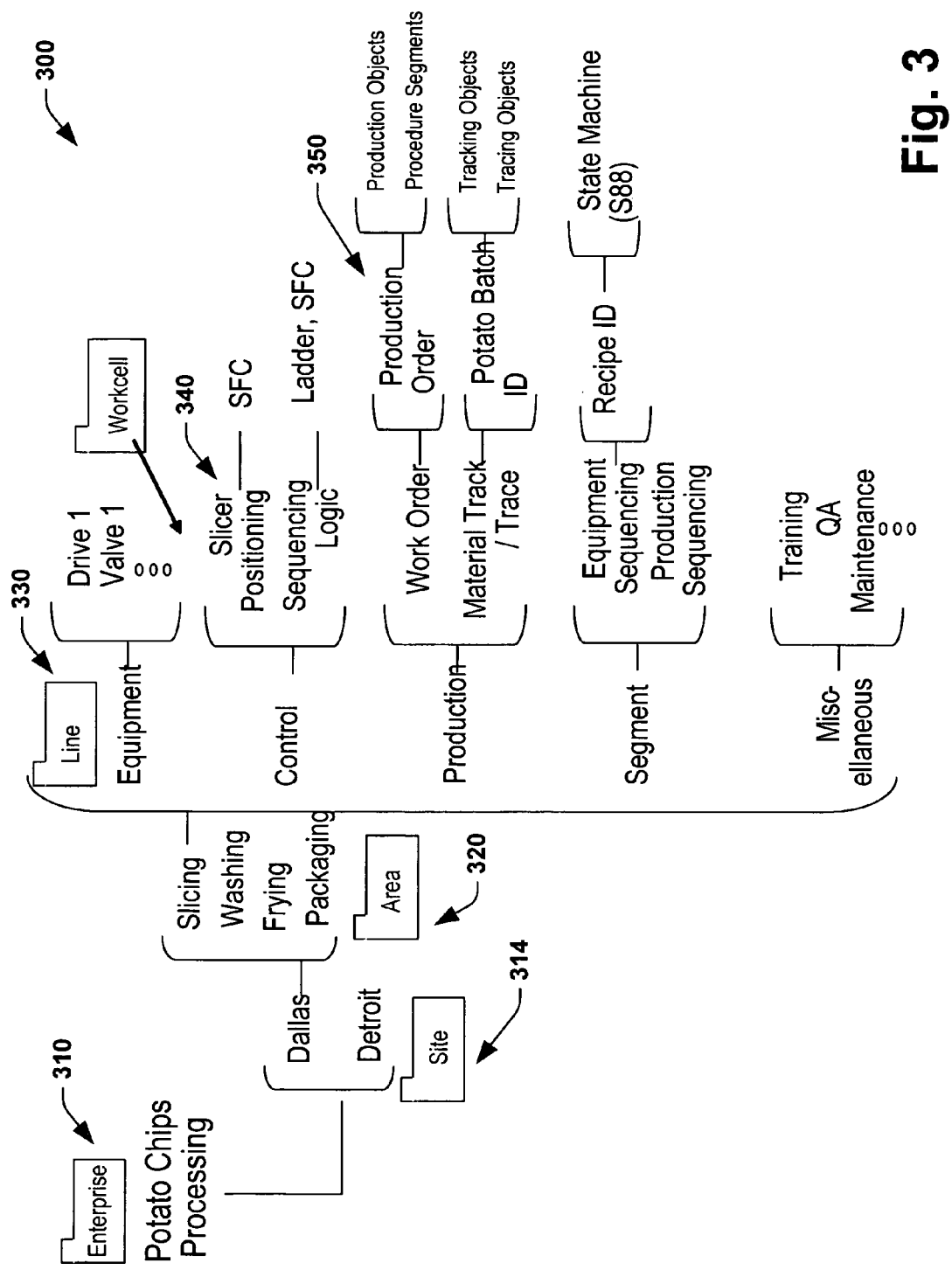
FIG. 3 is a diagram illustrating an example business model and hierarchical data representation that has been federated across an enterprise and control systems.

Turning to FIG. 3, an example business model 300 and hierarchical data representation is illustrated that has been federated across an enterprise and control systems. In this example, an enterprise 310 is represented in the model 300 which is at the highest levels of an organization. In this specific example, a commodity such as potato chips are produced by the enterprise. As can be appreciated, higher or lower levels than the enterprise 310 can be represented in the model 300. Beneath the enterprise level, two plants are represented at a site level 314 (e.g., one plant in Dallas and another in Detroit) although more or less than two shown can be employed. At 320, an area of a site includes some of the automated manufacturing processes for the site 314 such as slicing, washing, frying and packaging in this example.

From the respective area level 320, a line level 330 can be represented which includes equipment (further divided into work-cell), controllers, production components, segment components, and miscellaneous components such as training elements, quality control data, and maintenance data. At a control level 340, logic processors that execute sequential function charts or ladder logic are represented. Thus, from the high level enterprise view 310, data from the control view 340 is aggregated and federated from the top down where the data model shows a unified view of data that is distributed across remote or local geographic locations via network communications yet represented as a singular data model 300. At production and segment levels 350, components for processing data include work order elements, material managers, equipment sequencers, and production sequencers that may execute on machines such as batch processors or servers, for example.

Figure 4:
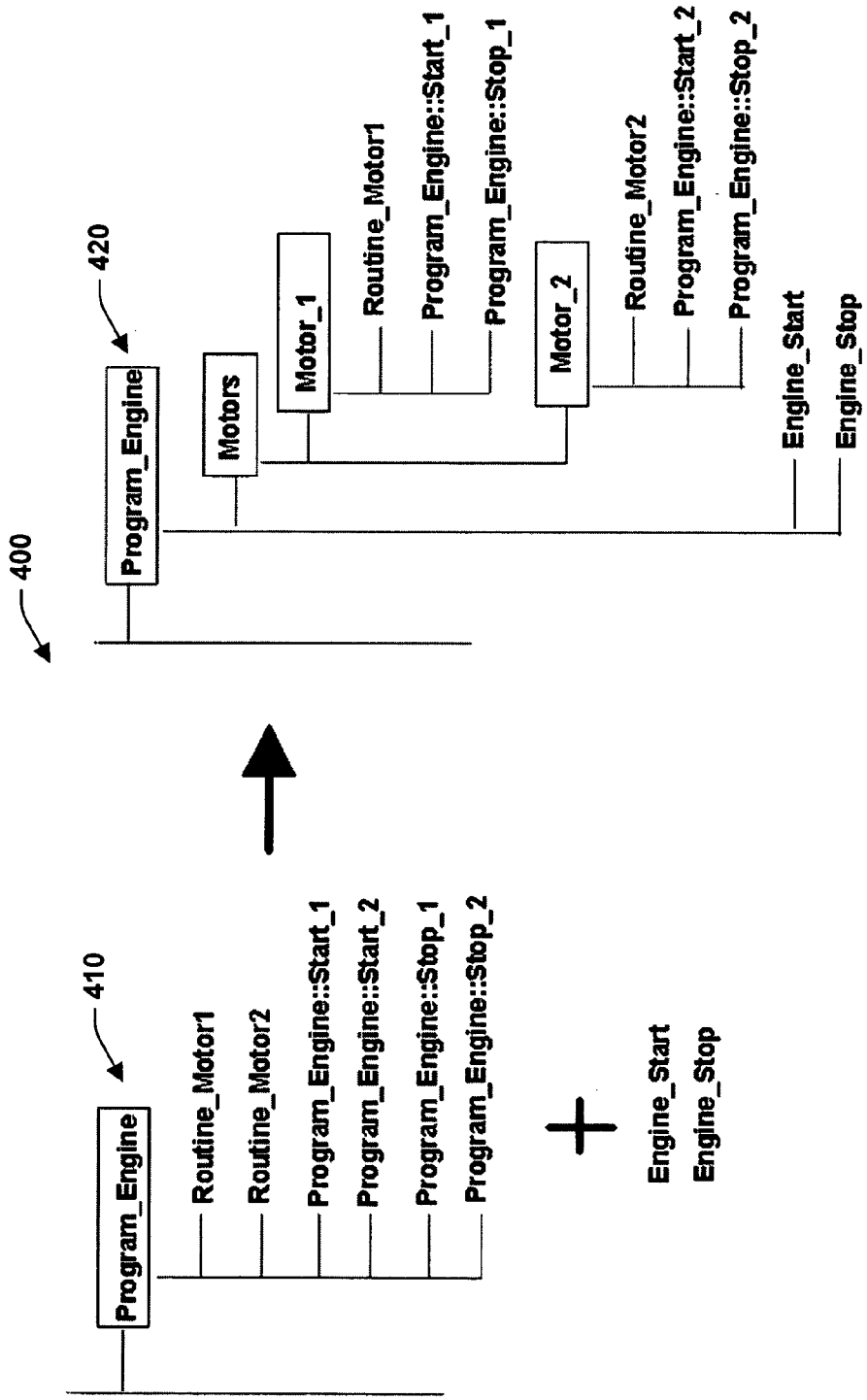
FIG. 4 is a diagram illustrating a flat and hierarchal data representation for a controller.

FIG. 4 illustrates flat and hierarchal data representations 400 for a controller. In this aspect, controller data representations can be integrated with hierarchical enterprise elements described above. Here, two views are shown. A flat representation at 410 shows a program engine that can start and stop two motors. A hierarchical view 420 of the same data structure 410 can be represented in the controller as well. In general, portions of an organizational hierarchy are stored in a runtime instantiation of a controller's operating environment which is accessible by a communications layer of the controller (e.g., controller foreground loop interfacing to a TCP/IP or Control Net stack). This will enable an external application executing at other levels of the hierarchy to address data in the controller via the flat controller name space at 410 and/or via the organizational hierarchy at 420. As can be appreciated, portions of the hierarchy can be implemented in the controller without being connected to a central system. This enables distributed development by multiple users such as OEMs and systems designers, for example. The organizational hierarchy can also include other organizational units, controller scoped tags, programs with associated program scoped tags, add-on instructions, routines, operator interfaces, and/or user defined information such has procedures and help files, for example.

Figure 5:
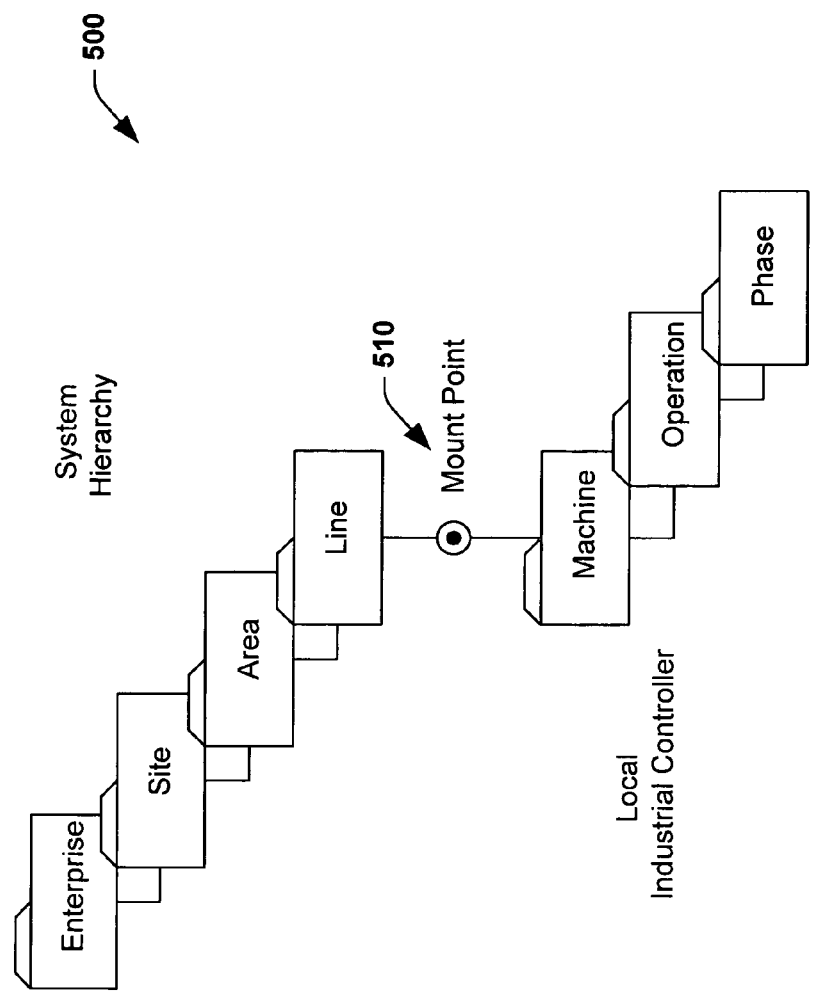
FIG. 5 is a diagram illustrating a mount point for a control system hierarchy.
Figure 6:
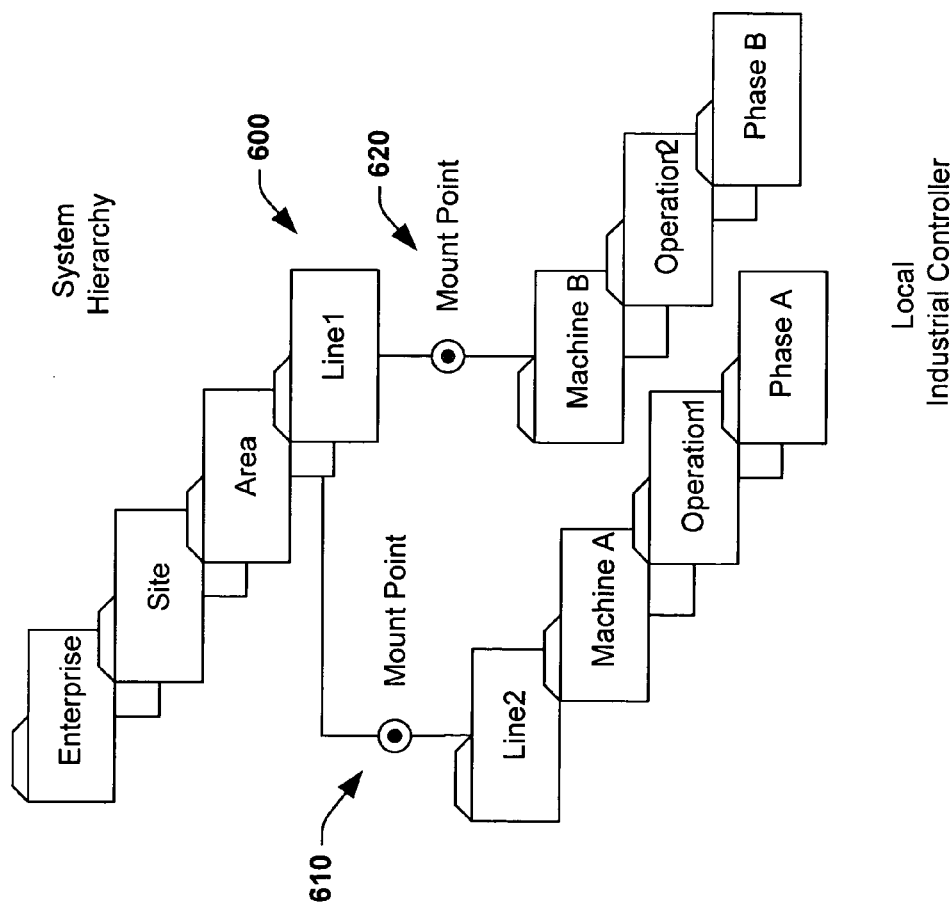
FIG. 6 is a diagram illustrating multiple mount points for a control system hierarchy.
Figure 7:
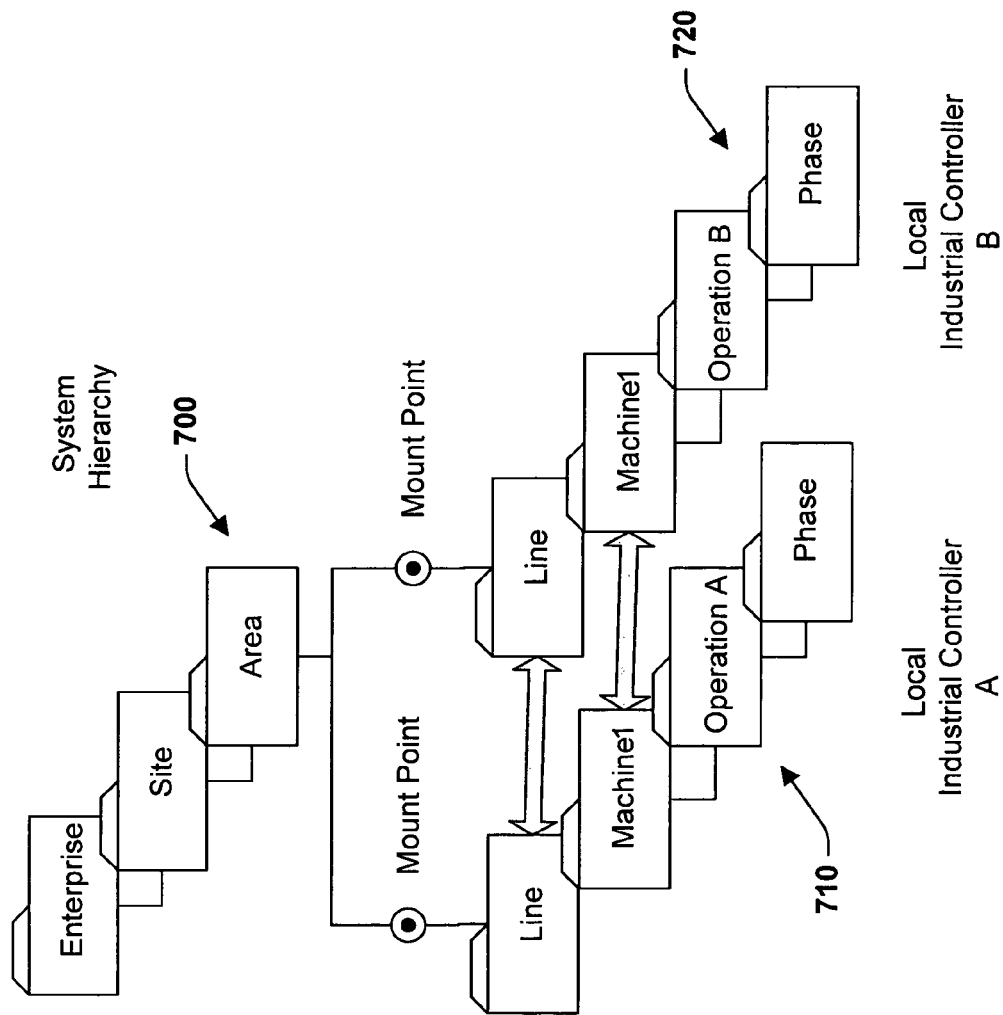
FIG. 7 is a diagram illustrating multiple mount point for a control system hierarchy and combined naming conventions.

FIGS. 5-7 illustrate a mount point examples for control system hierarchies. Mount points represent where in a distributed data hierarchy the controller is responsible for maintaining data at or below such level of mount point. Data above such level can be stored on enterprise components such as client or server computers in the enterprise. As illustrated in FIG. 5, the local hierarchy in a controller is connected to the system hierarchy 500 via a "mount point" at 510. This "mount point" 510 can be connected with a particular location in the system hierarchy during a configuration operation which associates this controller with a specific hierarchical project. Also, it is noted that the mount point 510 can be positioned at different portions of the hierarchy 500. FIG. 6 shows a single controller 600 that supports multiple "mount points" at 610 and 620 which can be mounted at different levels of the system hierarchy. At FIG. 7, an organization unit such as area 700 can be composed of components from multiple industrial controllers at 710 and 720. It is noted that organization units from multiple controllers with the same name can be combined.

Figure 8:
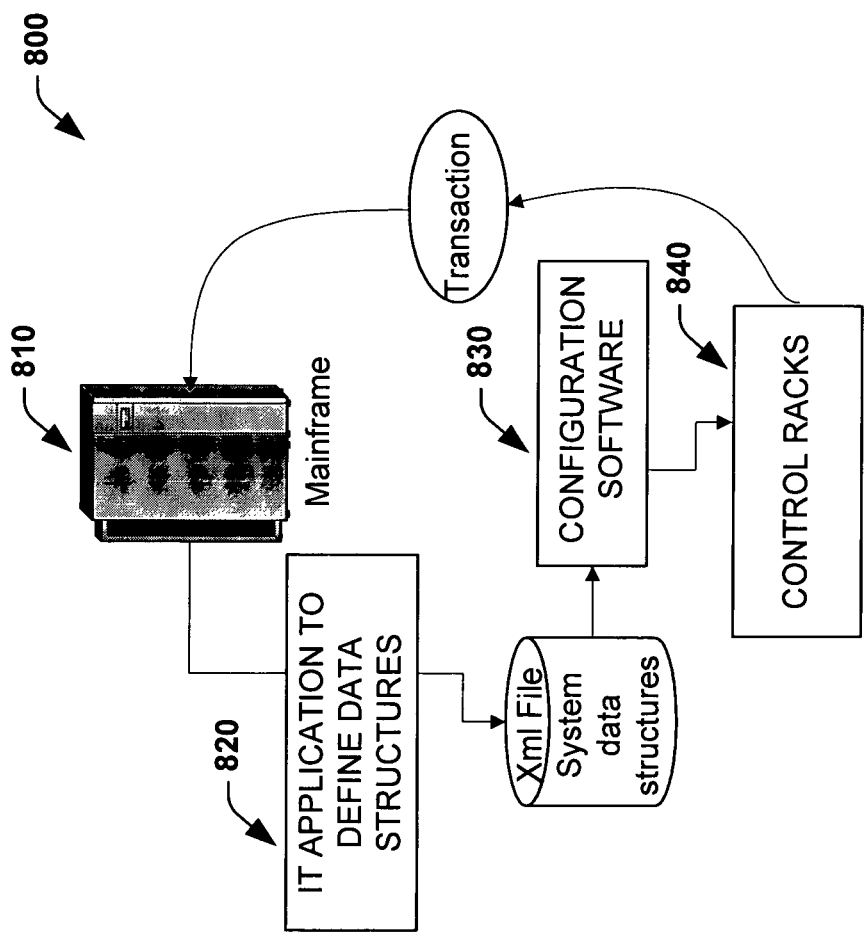
FIG. 8 is a diagram illustrating an example system for processing model data structures.

FIG. 8 illustrates an example system 800 for processing model data structures. The system 800 includes an enterprise computer 810, an application 820 for modifying data structures, configuration components 830, and one or more control racks 840. In general, an IT developer via an application can define a data structure 820 which can be deployed in the controller 840. The definition can be in the form of an XML file that describes the data structure, and the meaning for each of the respective members. This XML description could also be combined with other descriptions which would form a set of system structures. These definitions could be stored in a file which can be distributed to remote users with separate copies of the configuration software 830, if desired. A control engineer could then create instances of these system structures and fill in the data to enable sending the data to the IT applications 820. These system structures may be based on plant data standards such as S88 and S95, for example although other standards can be applied. The control system can also have a mechanism to enable a controller to originate a transaction based on an instruction in the controller that uses a system data structure as defined herein. The organizational structure or model can provide a way to indicate where a controller variable should be public or private and if public whether it can be written. Generally, only the subset of controller tags specified as public should appear in the organizational hierarchy.

Figure 9:
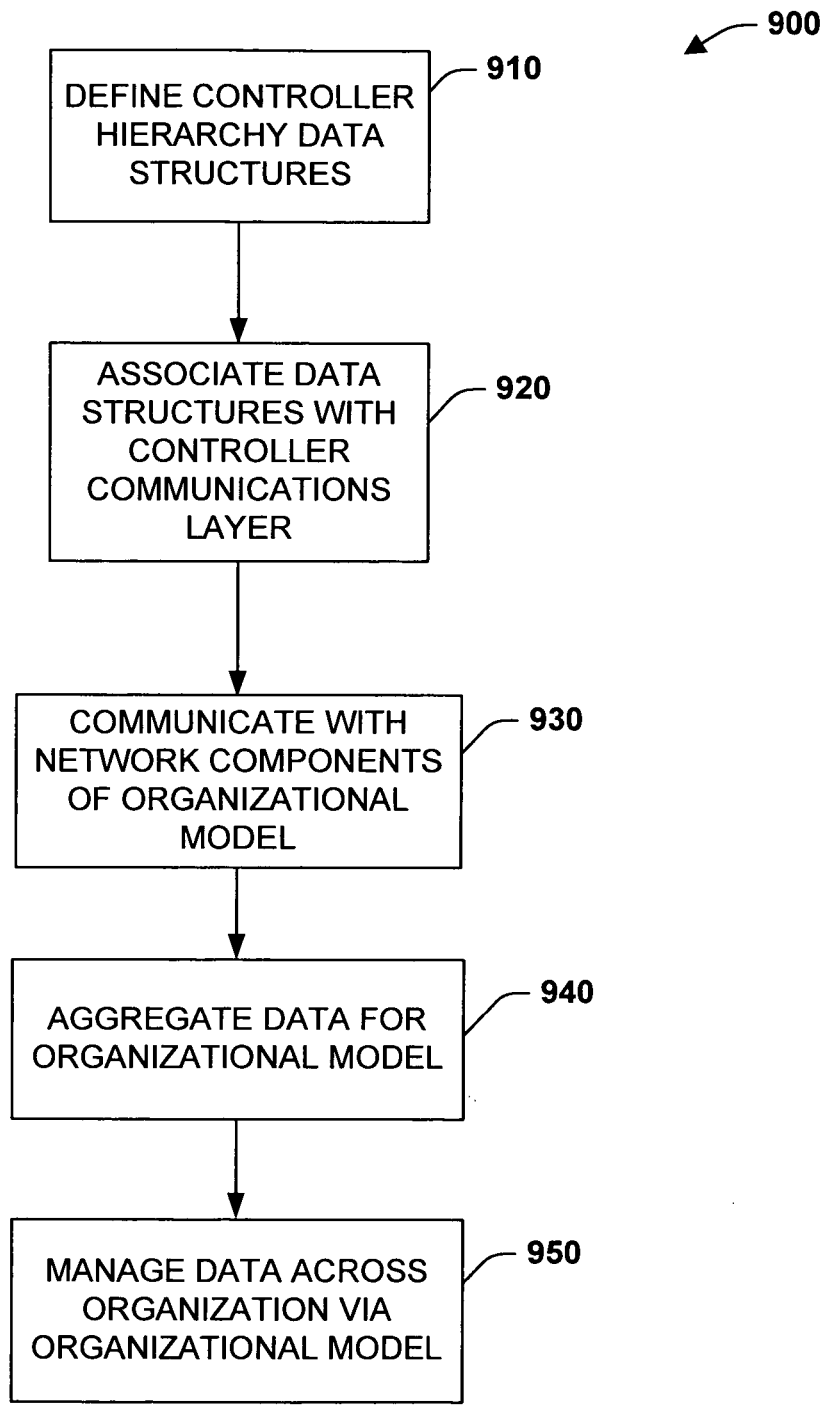
FIG. 9 is a flow diagram illustrating a control data and enterprise federation process.

FIG. 9 illustrates an organizational model and communications process 900. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

FIG. 9 illustrates a control model and communications process 900. Proceeding to 910, a one or more data structures are defined within the domain of a controller. This includes storing portions of a hierarchical model in a runtime instantiation of a controller or component associated with a controller. Such structures can be configured with controller configuration software for defining address locations for various components and network data. At 920, respective data structures defined at 910 are associated with a communications layer of the controller or control components. The layer can communicate with substantially any type of network including factory networks, global networks such as the internet, wireless networks, and so forth. At 930, portions of the organizational hierarchy that are stored on the controller can be communicated and interacted with other enterprise components across respective networks. This can include exchanging data from various portions of the enterprise over the network at different nodes and paths of the hierarchy or model. At 940, data for the enterprise and control systems are aggregated at a particular node or at a given network location. This could include aggregating or collecting, viewing, or collecting data at a network computer that communicates with the various data nodes of the enterprise and control hierarchy and then presenting such data at a display interface in a hierarchical form.

At 950, data is managed across the enterprise or organization via the hierarchical organization model. This can include viewing upper layers of the organization in higher level nodes of the hierarchy, where such layers may conform to such standards as S88 or S95 as previously noted. Data structures can be defined which exchange data between substantially all layers of an organization from lower-level control and configuration layers on a network to higher level data nodes of the enterprise. Respective nodes can be adapted with varying levels of security to control the type of human or machine access to a data node that may be available from different portions of the hierarchy.

Figure 10:
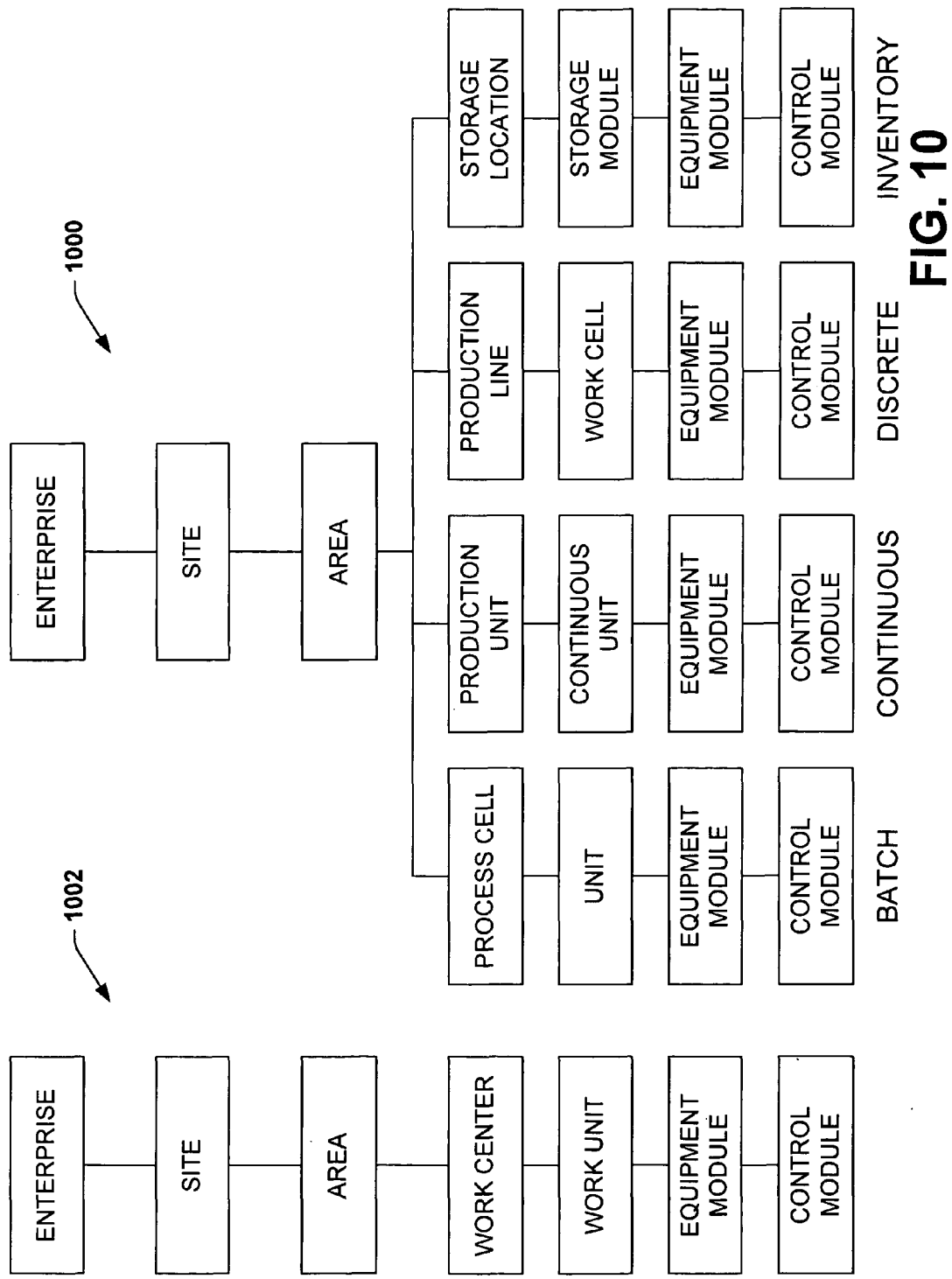
FIG. 10 illustrates exemplary hierarchies that can be utilized in connection with the hierarchically structured data model.

Now turning to FIG. 10, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 1000 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 1002 can be utilized that represents each of the aforementioned hierarchical representations. The hierarchy 1002 can include representations of an enterprise, a site, an area, a work center, a work unit, an equipment module, and a control module. Thus, a common representation can be generated that adequately represents the hierarchy 1000. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 1000). Metadata can be employed to enable display of such data in accordance with known, conventional usage of such data. Thus, implementation of a schema in accordance with the hierarchy 1002 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 1002 (or similar hierarchy) within a controller.

Figure 11:
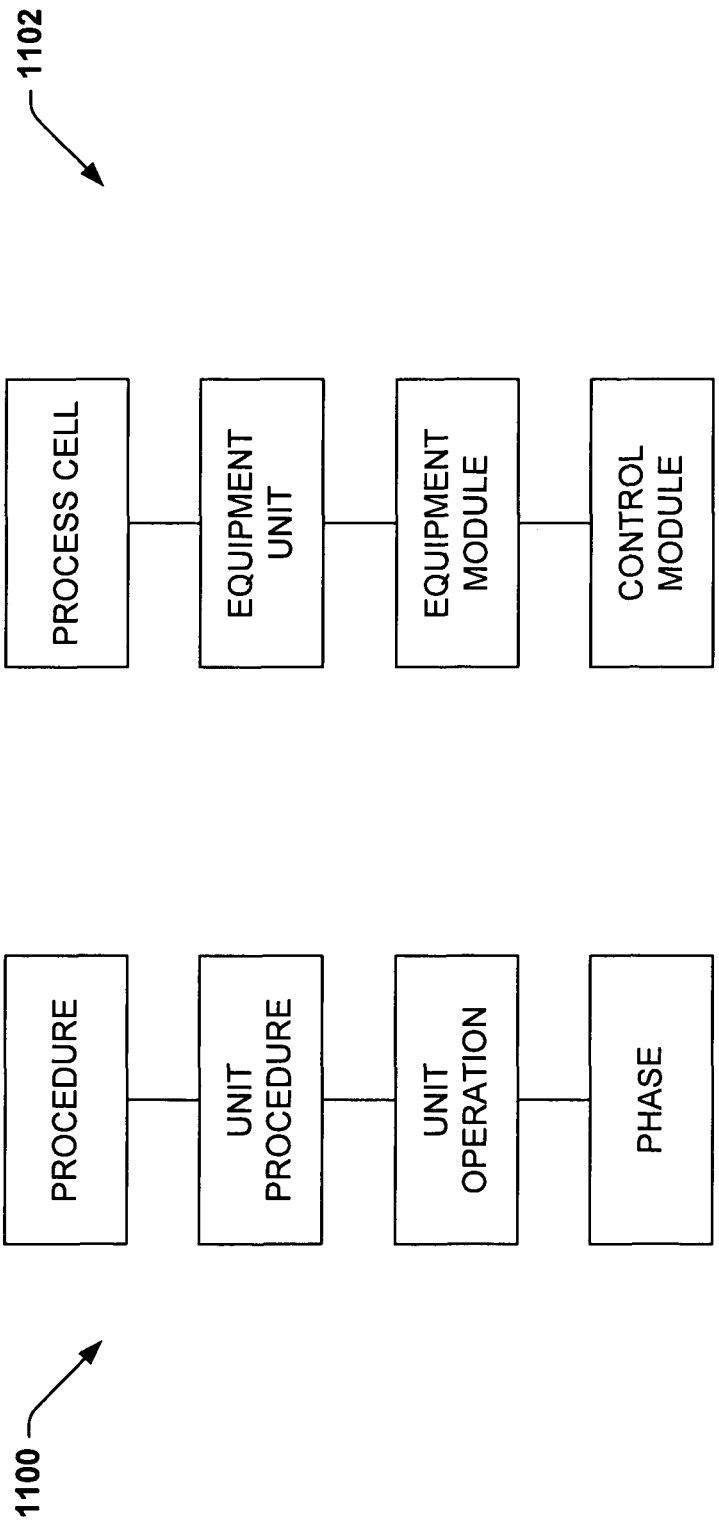
FIG. 11 illustrates exemplary hierarchies that can be utilized in connection with the hierarchically structured data model.

Now referring to FIG. 11, standard hierarchies that can be utilized to represent procedures and equipment are illustrated. In particular, a hierarchy 1100 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, and pausing a motor, opening and closing a valve, and the like. A hierarchy 1102 relating to a representation of equipment in, for example, a batch process is displayed adjacent to the hierarchy 1100. The representations within the hierarchy 1102 were described in greater detail with respect to FIG. 10.

Figure 12:
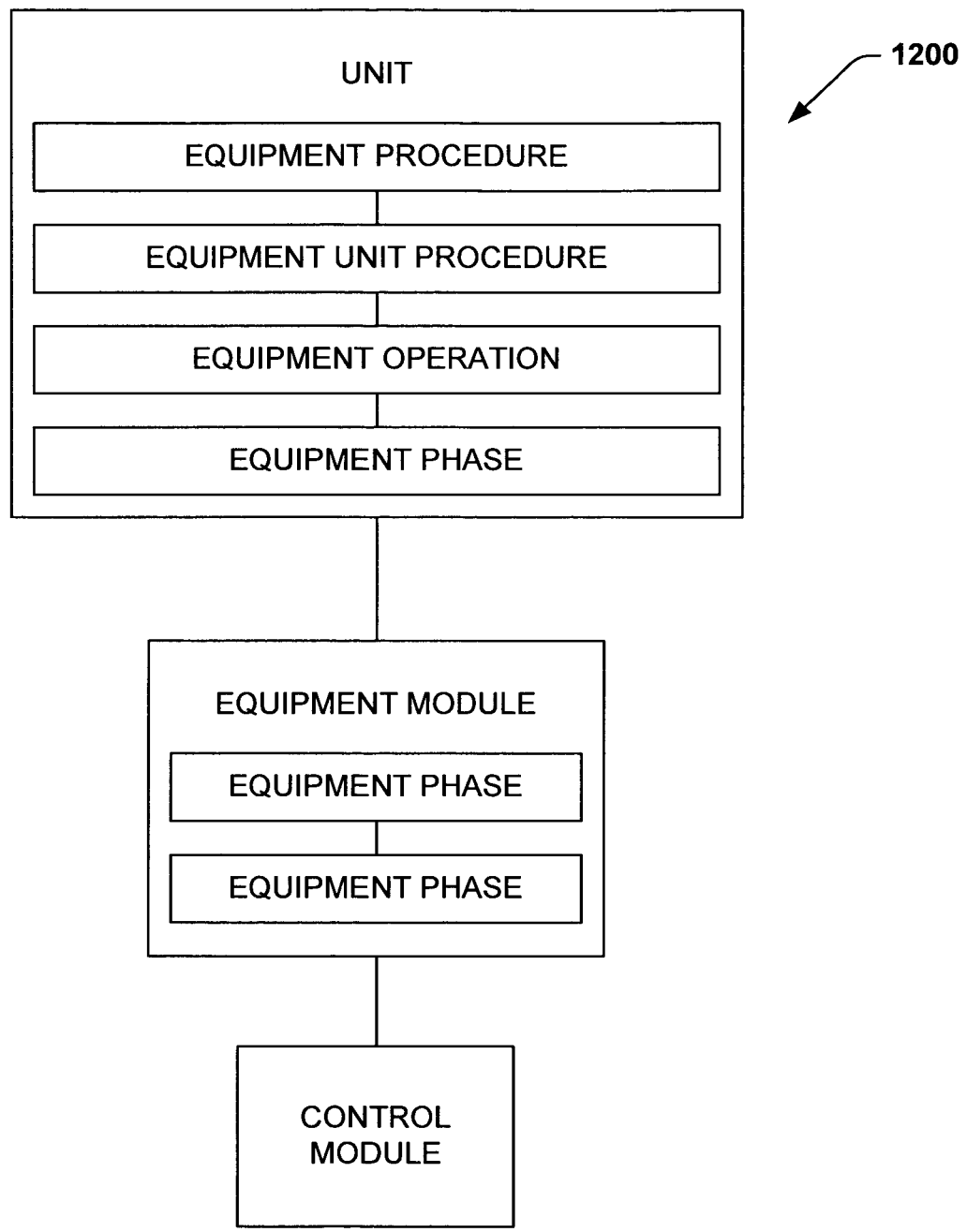
FIG. 12 illustrates an exemplary combination of hierarchies.
Figure 13:
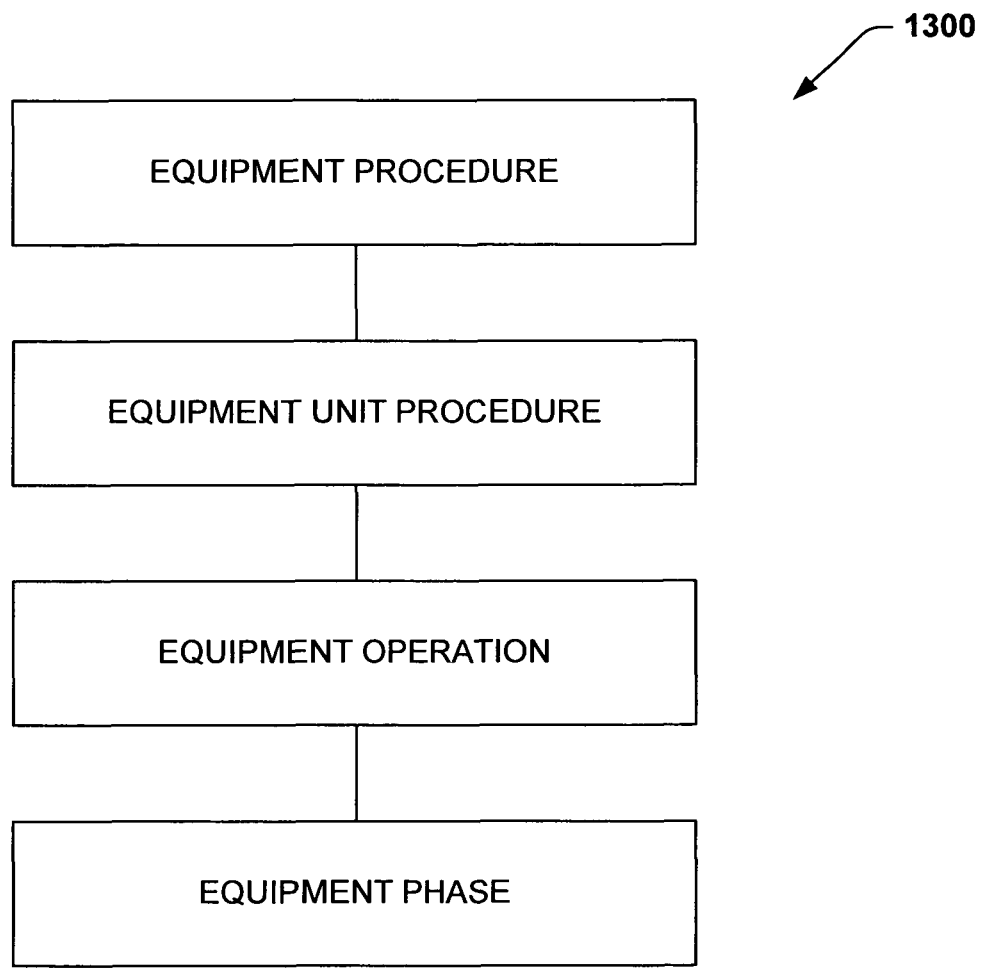
FIG. 13 illustrates an exemplary combination of hierarchies.

Now turning to FIG. 12, a hierarchy 1200 that represents one possible integration of the hierarchies 1100 and 1102 (FIG. 11) is illustrated. A unit (such as a work unit described in FIG. 10) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 13, a hierarchy 1300 that can be utilized in connection with equipment control is illustrated. The hierarchy is substantially similar to that described within the unit portion of the equipment unit. As stated above, the hierarchies illustrated in FIGS. 11-13 can be based upon a standard, such as ISA 88, ISA 95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 11-13 can be existent within a controller, together with state machines that enable creation of such objects.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data federation in an industrial system, comprising:
   a processor, coupled to a memory, that executes computer-executable components, the computer-executable components comprising:
      a configuration component configured to receive first configuration input that creates a first subset of a hierarchical data model of an industrial organization in an industrial controller, second configuration input that defines a second portion of the hierarchical data model in a device different than the industrial controller, and third configuration input that defines a mount point in the industrial controller,
      wherein the first subset of the hierarchical data model comprises a first set of nodes defining first hierarchical relationships between first entities on a control level of the industrial organization,
      wherein the second subset of the hierarchical data model comprises a second set of nodes defining second hierarchical relationships between second entities on an enterprise level of the industrial organization that is hierarchically higher than the control level; and
      wherein the mount point defines a location in the hierarchical data model where the first subset of the hierarchical data model connects to the second subset of the hierarchical data model and facilitates aggregation of the first portion of the hierarchical data model and the second portion of the hierarchical data model at the location.

2. The system of claim 1, wherein the hierarchical data model conforms to a user-defined hierarchy.

3. The system of claim 1, wherein the first subset of the hierarchical data model is stored in a runtime instantiation of the industrial controller accessible via a communications layer of on operating environment of the industrial controller.

4. The system of claim 1, wherein the hierarchical data model comprises one or more organizational units that are distributed among the device and the industrial controller.

5. The system of claim 1, wherein the hierarchical data model comprises one or more organizational units representing one or more physical locations or one or more logical groupings of nodes.

6. The system of claim 5, wherein the first set of nodes are associated with respective data items maintained within the industrial controller.

7. The system of claim 1, wherein the hierarchical data model is distributed across multiple components of the industrial organization residing on at least one of a local network, a factory network, a remote network, or a wide area network.

8. The system of claim 1, wherein the hierarchical data model conforms to at least one of an S88 model or an S95 model.

9. The system of claim 8, wherein the hierarchical data model includes at least a line level that comprises at least one of an equipment component, a control component, a production component, a segment component, or a miscellaneous component.

10. The system of claim 1, the computer-executable components further comprising a controller component configured to at least one of convert a flat data structure to a hierarchical data structure or convert the hierarchical data structure to the flat data structure.

11. The system of claim 1, wherein the hierarchical data model further comprises at least one of one or more controller scoped tags, one or more programs with associated program scoped tags, one or more add-on instructions, one or more control routines, one or more operator interfaces, or user defined information.

12. The system of claim 1, wherein the mount point defines a location in the hierarchical data model below which the industrial controller is responsible for maintaining data.

13. The system of claim 1, wherein the third configuration input associates the mount point with the location in the hierarchical data model during a configuration operation that associates the industrial controller with a hierarchical project.

14. The system of claim 1, the computer-executable components further comprising a communications component configured to facilitate presentation of data items in the industrial controller on an application that is external to the industrial controller using a hierarchical namespace that accords to the hierarchical data model.

15. The system of claim 1, wherein the first entities and the second entities comprise at least one of control equipment, one or more controller tags, one or more backing tags, one or more programs, one or more equipment phases, or one or more I/O devices.

16. The system of claim 1, wherein the configuration component is further configured to receive fourth configuration data that sets a tag associated with the hierarchical data model as one of public or private, wherein setting the tag as public renders the tag viewable from an application that reads data from the industrial controller.

17. A non-transitory computer-readable medium having stored thereon computer-executable instructions that, in response to execution by a computing system including a processor, cause the computing system to perform operations, the operations comprising:
   creating, in response to first configuration input, a controller data structure comprising a first portion of a hierarchical data model of an industrial organization, wherein the first portion of the hierarchical data model is maintained in a controller and comprises one or more first nodes defining hierarchical relationships between a first set of entities on a control level of the industrial organization;
   creating, in response to second configuration input, an enterprise data structure comprising a second portion of the hierarchical data model, wherein the second portion of the hierarchical data model is maintained in a device that is different than the controller and comprises one or more second nodes defining hierarchical relationships between a second set of entities on an enterprise level of the industrial organization that is hierarchically higher than the control level;
   defining, in response to third configuration input, a mount point in the controller that defines a location within the hierarchical data structure at which the first portion of the hierarchical data structure connects to the second portion of the hierarchical data structure; and
   aggregating the first portion of the hierarchical data structure and the second portion of the hierarchical data structure based on the mount point.

18. The non-transitory computer-readable storage medium of claim 17, wherein the one or more first nodes represent entities associated with the controller including at least one of control equipment, one or more controller tags, one or more backing tags, one or more programs, one or more equipment phases, or one or more I/O devices.

19. The non-transitory computer-readable storage medium of claim 18, the operations further comprising storing the controller data structure in a runtime instantiation accessible via a communications layer of the controller's operating environment.

20. A method for data communication, comprising:
defining, in a controller comprising a processor, a first portion of a hierarchical data model of an industrial organization, wherein the first portion of the hierarchical data model comprises one or more first nodes that define first hierarchical relationships between first entities of a control layer of an organizational hierarchy;
defining, in a first network node that is different than the controller, a second portion of the hierarchical data model, wherein the second portion of the hierarchical data model comprises one or more second nodes that define second hierarchical relationships between second entities of an enterprise layer of the organizational hierarchy, wherein the enterprise layer is hierarchically higher than the control layer;
defining, in the controller, a mount point that identifies a location within the hierarchical data model at which the first portion of the hierarchical data model connects to the second portion of the hierarchical data model; and
aggregating the first portion of the hierarchical data model and the second portion of the hierarchical data model based on the mount point.

21. The method of claim 20, further comprising selectively assigning one of a public data property or a private data property to a data object of the controller via the hierarchical data model.

22. The method of claim 20, further comprising rendering a hierarchical view of the hierarchical data model, wherein the rendering comprises combining nodes defined by the hierarchical data model having similar names and residing in different devices.

23. The method of claim 20, further comprising rendering a hierarchical view of the hierarchical data model, wherein the rendering comprises rendering organizational units comprising the first portion of the hierarchical data model and the second portion of the hierarchical data model.

24. The method of claim 20, wherein the defining the first portion of the hierarchical data model comprises defining the first nodes to represent at least one of control equipment, one or more controller tags, one or more controller programs, one or more equipment phases, or one or more I/O devices.

25. The non-transitory computer-readable storage medium of claim 17, further comprising rendering, at a display interface that communicates with the controller data structure and the enterprise data structure, first data items maintained in the controller and second data items maintained in the device in a hierarchical manner as defined by the hierarchical data model.

26. The method of claim 20, further comprising rendering a hierarchical view of data objects on the controller and the first network node on a second network node, wherein the hierarchical view is based on the hierarchical data model derived by the aggregating.

* * * * *